United States Patent
Erickson et al.

(10) Patent No.: US 8,514,929 B2
(45) Date of Patent: Aug. 20, 2013

(54) COMBINED AUDIO/VIDEO/USB DEVICE

(75) Inventors: Steven S. Erickson, Los Gatos, CA (US); Chris A. Smith, Santa Clara, CA (US)

(73) Assignee: Creative Technology Ltd, Singapore (SG)

( * ) Notice: Subject to any disclaimer, the term of this patent is extended or adjusted under 35 U.S.C. 154(b) by 1598 days.

(21) Appl. No.: 11/031,610

(22) Filed: Jan. 5, 2005

(65) Prior Publication Data

US 2006/0147185 A1   Jul. 6, 2006

(51) Int. Cl.
- *H04N 7/12* (2006.01)
- *H04N 11/02* (2006.01)
- *H04N 11/04* (2006.01)
- *H04N 7/14* (2006.01)

(52) U.S. Cl.
USPC .................................................. 375/240.01

(58) Field of Classification Search
USPC ..... 348/14.04, 14.07, 14.12, 14.13; 396/108, 396/109, 112; 375/240.01, 240.02, 240.24
See application file for complete search history.

(56) References Cited

U.S. PATENT DOCUMENTS

| | | | |
|---|---|---|---|
| 5,926,226 A | 7/1999 | Proctor et al. | |
| 7,151,799 B2 | 12/2006 | Kato et al. | |
| 7,383,344 B2 * | 6/2008 | Hunter | 709/231 |
| 2002/0044201 A1 * | 4/2002 | Alexander et al. | 348/14.08 |
| 2002/0046404 A1 * | 4/2002 | Mizutani | 725/58 |
| 2002/0071485 A1 | 6/2002 | Caglar et al. | |
| 2003/0091325 A1 * | 5/2003 | Estevez | 386/46 |
| 2003/0194208 A1 * | 10/2003 | Inoue et al. | 386/52 |
| 2005/0147376 A1 * | 7/2005 | Lim | 386/4 |
| 2005/0184161 A1 * | 8/2005 | Chen et al. | 235/486 |
| 2005/0231586 A1 * | 10/2005 | Rodman et al. | 348/14.07 |
| 2006/0013416 A1 * | 1/2006 | Truong et al. | 381/119 |

* cited by examiner

*Primary Examiner* — Kelly L Jerabek
(74) *Attorney, Agent, or Firm* — Creative Technology Ltd

(57) ABSTRACT

A combined audio video device includes inputs for receiving an audio video signal from a source. The device includes in one enclosure audio and video processor portions configured such that the audio and video processors use a common communications line for coupling electrical signals form the device to a host computer. The audio processor is operable to accept an audio signal and to provide audio enhancements to the audio signal. In one embodiment, the common communications line is a USB cable. In another embodiment, a USB hub is integrated into the device.

15 Claims, 5 Drawing Sheets

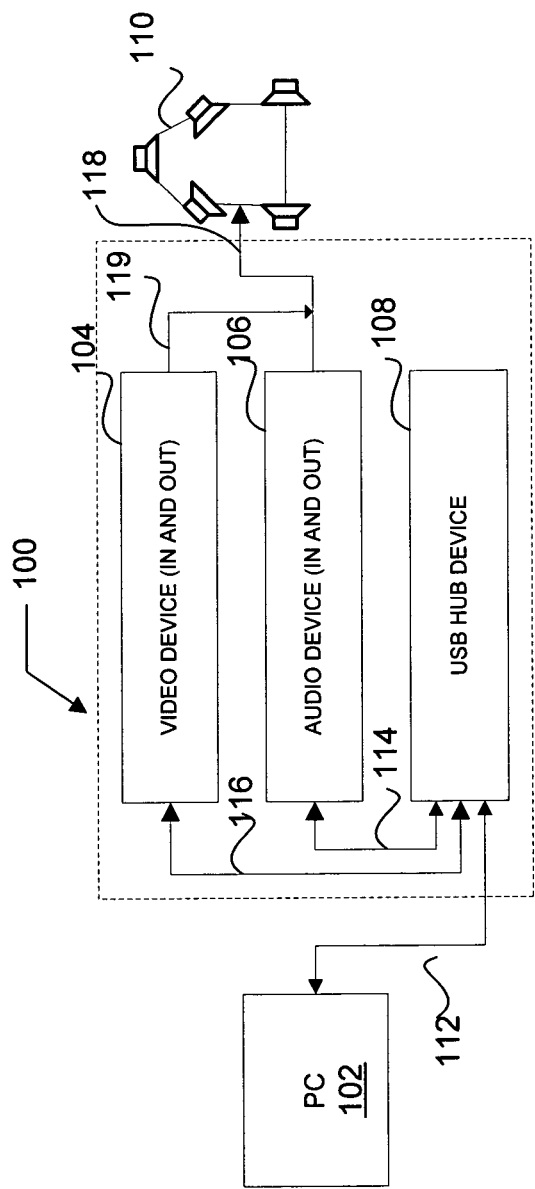
Fig._1

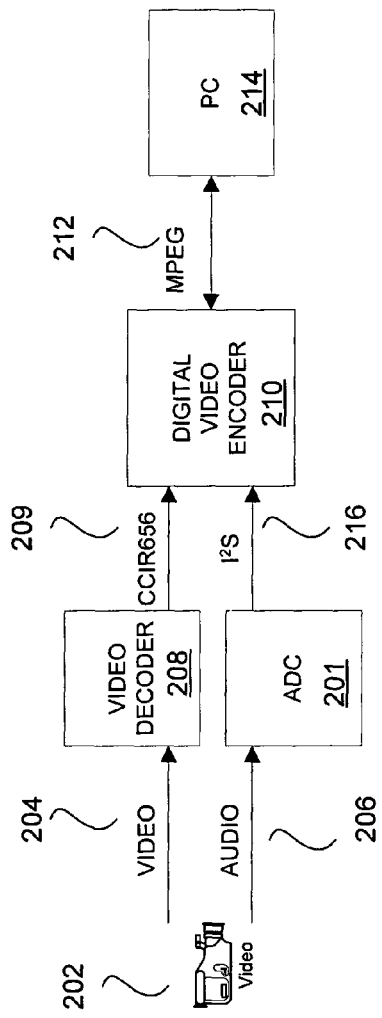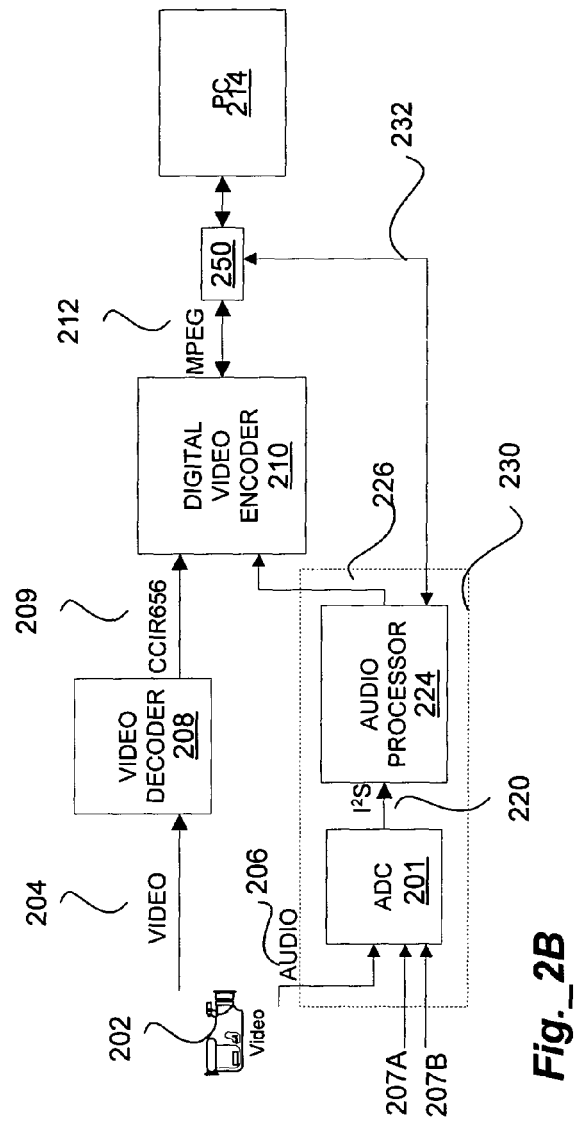

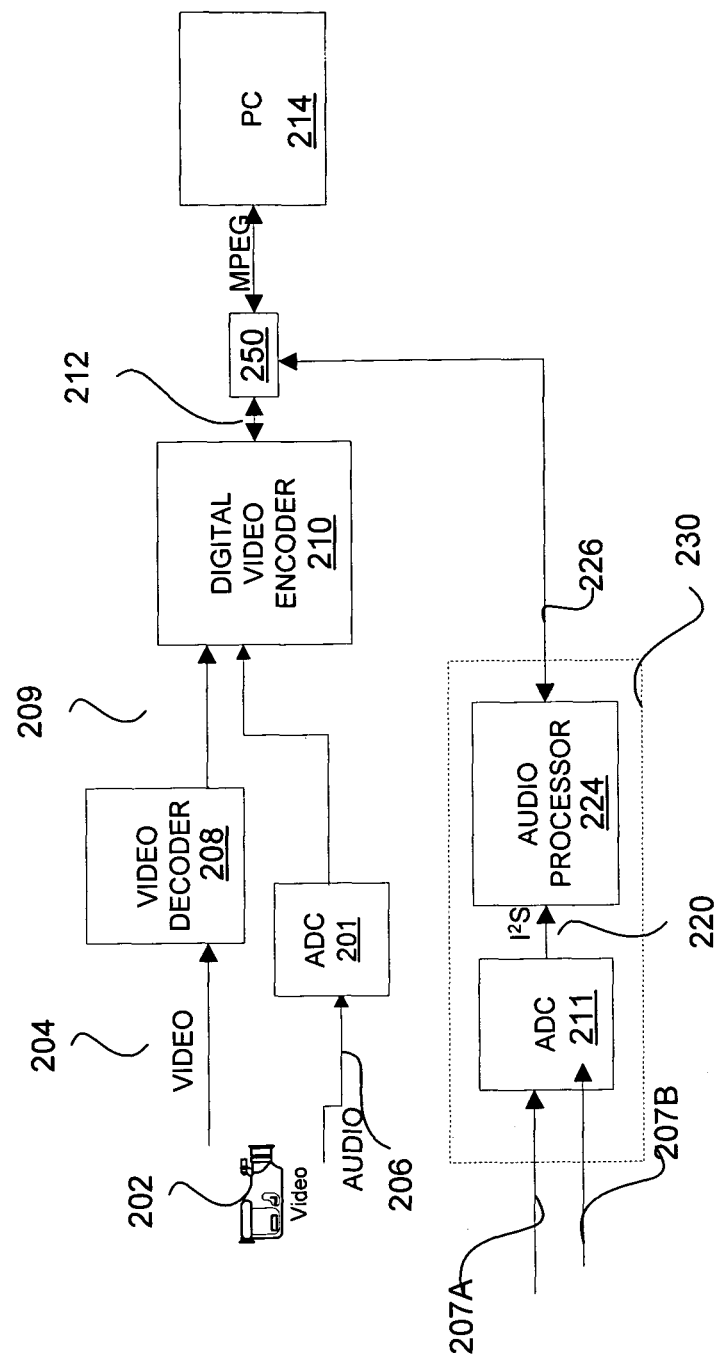
Fig._2C

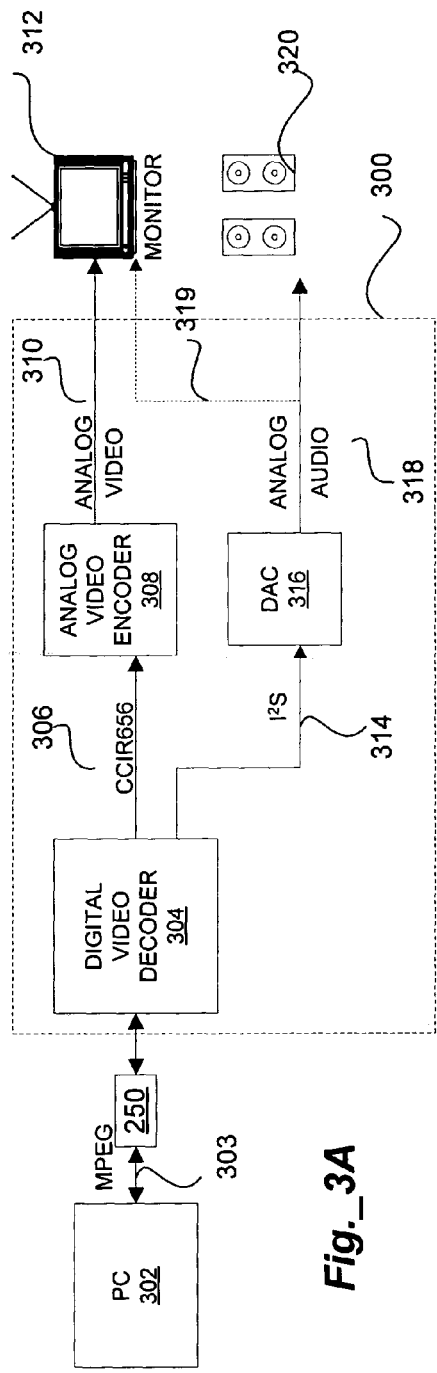
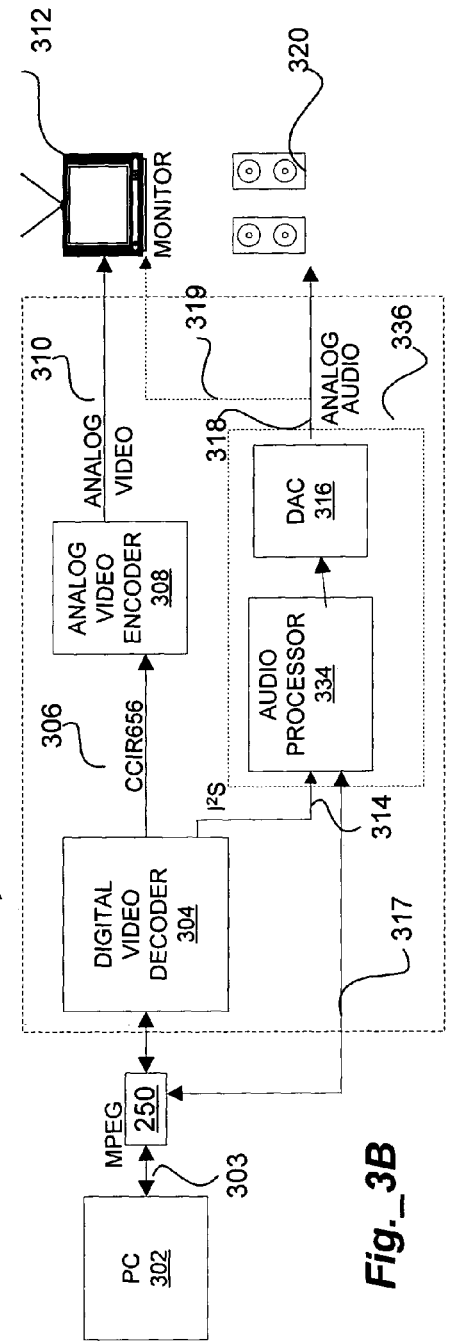
Fig. _3A
Fig. _3B

COMBINED AUDIO/VIDEO/USB DEVICE

BACKGROUND OF THE INVENTION

1. Field of the Invention

The present invention relates to audio video products. More particularly, the present invention relates to audio video devices configured for connection to host computers.

2. Description of the Related Art

With the advancements in imaging technology and increased computer processing power, much attention has been focused on the acquisition and processing of audio/video data in personal computers. Currently, video sources provide audio and video data in either or both of analog and digital formats. In order to facilitate the processing of video signals by computers, video boards having image acquisition capabilities are used.

These boards typically accept a video signal in either an analog or digital format and transmit the signal in a digitally encoded format to the computer. Analog signals, in particular, require conversion to a digital format and in many cases compression before the data is transmitted to the host computer. Analog video signals are typically organized into frames, typically 30 frames or 60 fields per second. An analog to digital converter (ADC) digitizes the incoming video signal in response to synchronization information embedded in the analog video signal.

The resulting digitized frame samples are temporarily stored in a frame acquisition buffer and then transferred to the computer system memory for further processing. In contrast, a digital video source (e.g. a digital camcorder) provides a digital video signal to the video board via the digital video port. Since the digital video signal already comprises a stream of digitized video frames, the ADC on the video card is bypassed and the digitized frame data is forwarded directly to the frame acquisition buffer in the card. The data is then transferred to the computer via a communications cable. Further, it may be compressed in a standard format, such as MPEG, before transmission to the host computer. The audio signal is also converted where necessary to digital formats and stored in a synchronized manner with the stored digital video data frames.

Audio boards are also used with computers to provide enhanced audio signals. In some cases external audio cards are coupled to a computer to add audio processing capabilities to those available from the host computer.

While both video capture cards and audio cards are available in an external form and having USB compatibility for communication via a USB cable to the host computer, providing separate external devices requires multiple communications cables for connection to the host computer, as well as multiple enclosures and power cables. Moreover, communication between the video module and the audio module in such a configuration requires signals to be routed via the host computer.

It is therefore desirable to provide an improved device for providing audio and video signal processing.

SUMMARY OF THE INVENTION

The present invention provides a device combining audio and video processing and USB hub functionality. A variety of audio and video input ports are provided for receiving a signal from an audio video source. A variety of audio video combined feed through/processed signal output ports are also provided. A single communications cable, such as a USB cable, is further provided to transmit the digitized audio video data to the attached host computer and to receive signals from the computer. According to one alternative embodiment, an integrated USB hub is provided in the combined audio video card.

In accordance with a first embodiment, an audio video capture device for coupling to a host computer is provided. The device includes a video processor configured for converting an analog audio video input signal to a digitized video signal and transmitting the digitized video signal to the host computer. The device also includes an audio processor configured to convert an analog audio signal to a digitized audio signal and to prove audio enhancements to the digitized audio signal. The digitized audio signal and the digitized video signal are transmitted to the host computer over a common transmission line, for example a USB cable. The audio enhancements include at least one of filtering, sound expansion, sound spatialization, mixing, upmixing, downmixing, noise reduction and reverberation. According to a second embodiment, the device further includes an integrated USB hub.

The device is configured to provide audio enhancements to at least one of a plurality of audio input signals. In one embodiment, the at least one of the plurality of audio input signals comprises an audio signal received at the input ports of the device and digitized if the signal is analog. In accordance with another embodiment, the at least one of the plurality of audio input signals is transmitted from a video source such as a camcorder. The video signal is digitized to generate a digitized audio signal corresponding to the input audio video signal provided to the device.

According to one embodiment, S-video, composite, and DV inputs are provided. S-video, composite, and DV outputs are also provided. According to one embodiment, digital outputs such as TOSLINK optical connections or SPDIF coaxial connections are also provided. The USB connection permits a single USB communications line to transmit and receive processed and unprocessed audio, video, and control information (data) with the attached host computer. By providing a common audio output connection, a combined group of speakers may be used for many applications, such as for music, gaming, and video monitoring (the audio portion).

In accordance with one embodiment, a combined audio video device is provided operable in at least two modes. In the first mode, analog video signals and analog audio signals are separately fed into respectively a video decoder and an audio ADC (analog to digital converter housed within a common enclosure and utilizing a common power cable. The resulting signals are then combined in a digital video encoder, resulting preferably in an encoded stream fed into the computer. In the second operating mode, the device's audio processor first processes the audio received from the ADC module before being combined with the digitized video signal in the video encoder. Preferably, the device's audio processor performs at least one of noise cleanup, gain control, virtual up mixing, converting mono to stereo, and adding other sound environments. This enhanced audio functionality is preferably available during both audio/video capture and encoding, and is preferably performed so as to optimally preserve the fidelity of the audio signal. The audio processor preferably operates at a higher bit depth thereby reducing noise. For example, during a noise reduction process, a 16 bit signal from the decoder can be processed in 24 bits. This helps maintain a high signal to noise ratio.

According to yet another embodiment, the combined audio video device is also configured to provide enhanced playback and monitoring. That is, processed audio/video signals may be transmitted from the computer for evaluation and monitoring by the user or output to a VCR or camcorder. In accordance with this embodiment, the processed audio/video signal is directed from the host computer to a digital video decoder where it is decompressed into separate digital audio and video streams. The video stream is forwarded to an analog video encoder for conversion to an analog signal compatible with the video monitor. The digital audio signal, for example an I²S signal, is then forwarded to a DAC before playback and monitoring on attached speakers. In an alternative embodiment, the digital signal (audio) is first processed by the device's audio processor before conversion to an analog signal by the audio section's DAC. In this case, the device's audio processor preferably performs at least one of noise cleanup, gain control, virtual up mixing, converting mono to stereo, and adding other sound environments.

According to yet another embodiment, the device is configured to accept signals from a host computer, for example sign a USB cable and a USB hub positioned between the device and the host computer. The signal is transmitted from the host computer to the audio processor to monitoring speakers for music playback or computer gaming. Alternately, the signal is transmitted to the digital video decoder, processed by the audio processor for playback, or directly to the video monitor's audio (or output to a VCR))

These and other features and advantages of the present invention are described below with reference to the drawings.

BRIEF DESCRIPTION OF THE DRAWINGS

FIG. 1 is a diagram illustrating a combined audio, video, USB device in accordance with one embodiment of the present invention.

FIG. 2A is a diagram illustrating a circuit configuration for a combined audio video device in accordance with one embodiment of the present invention.

FIG. 2B is a diagram illustrating a circuit configuration for a combined audio video device in accordance with one embodiment of the present invention.

FIG. 2C is a diagram illustrating a circuit configuration for a combined audio video device in accordance with one embodiment of the present invention.

FIG. 3A is a diagram illustrating a circuit configuration for a combined audio video device in accordance with one embodiment of the present invention.

FIG. 3B is a diagram illustrating a circuit configuration for a combined audio video device in accordance with one embodiment of the present invention.

DETAILED DESCRIPTION OF PREFERRED EMBODIMENTS

Figure 4A:
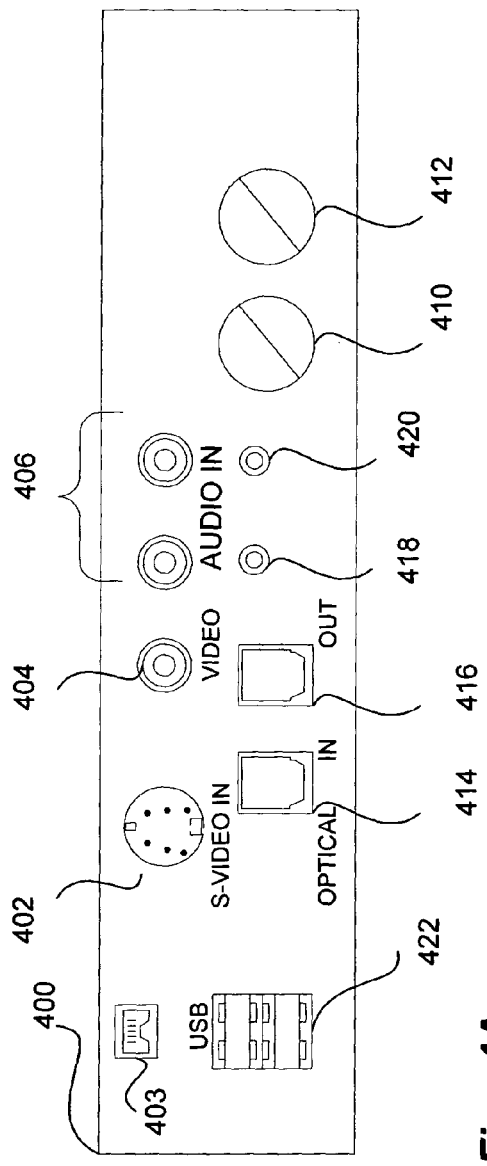
FIGS. 4A-B are diagrams respectively illustrating front and rear panels of an exemplary combined audio video device in accordance with one embodiment of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

In one embodiment of the present invention, a combined audio, video, and USB hub is provided. The video capture portion enables capturing of analog or digital video from a peripheral device, such as a camcorder. The video captured is transferred in a digital stream for storage on a hard drive of a host computer. The digitized video may then be accessed randomly and edited. Editing may take any form to include adding special effects such as for example animation and adding titles.

Most conventional host computers are configurable with software for video editing. However, most such computers do not have either analog video inputs or outputs. Typically, separate video capture cards or devices are used to capture and record video from camcorders or other video sources. Hardware and/or software compression (codecs) are employed to reduce the size/bitrate of the digitized video prior to storage on the host device. For example, one common digitized and compressed format is MPEG-2.

Adapter cards having DV or IEEE1394 connectors (firewire) are also used to import digital video streams from digital camcorders. These typically are cards having edge connectors configured for insertion into matching PCI slots accessible from the exterior of host computers. Many laptop and desktop PC computers do not have built in DV connectors. Moreover, notebook computers are not generally compatible with PCI add-on cards.

While both video capture cards and audio cards are available in an external form and having USB compatibility for communication via a USB cable to the host computer, providing separate external devices requires multiple communications cables for connection to the host computer. Moreover, communication between the video module and the audio module in such a configuration requires signals to be routed via the host computer. By combining the audio and video modules onto one device external to the host computer, and further incorporating a USB hub, communications between the audio and video modules can be more efficiently achieved.

FIG. 1 is a diagram illustrating a combined audio, video, USB device in accordance with one embodiment of the present invention. In particular, the efficiency achieved by using common connections and communications cables is illustrated. The combined audio, video, USB device 100 is preferably configured such that the video portion 104 and the audio portion 106 communicate with a host computer 102 via a single USB cable 112. That is, USB device 108 is a USB hub, having at least one USB input port and at least one USB output port for connecting external devices. Further, the USB hub 108 is preferably configured with internal ports for connection with the video portion 104 and the audio portion 108. That is, bi-directional communication is provided between the USB hub 108 and each of the video device 104 and the audio device (portion) 106, respectively by internal connections 114 and 116. In this way, communications between each of the video 104 and audio 106 portions with the host computer 102 may be made over a single USB cable. That is, the USB hub device acts as a bi-directional repeater/router for signals having their source or destination in the video processor portion, audio processor portion, or PC host computer. The USB hub device 108 preferably complies with at least the USB 1.1 specification, and more preferably the USB 2.0 specification, thus providing bandwidth of up to 480 Mb/sec. The USB hub device may be bus powered or more preferably self powered for more stable USB device power management.

The video capture portion 104 is preferably configured to accept input video signals and generate output video signals using a variety of connectors. For example, the combined AV USB device 100 is preferably configured with composite video, S-video (Y/C), component video (YCrCb), and DV (IEEE1394) connectors for providing a video signal from a video source such as a camcorder. Likewise, the combined audio video USB (AV USB) device is also configured with a variety of output video connectors for monitoring a signal, such as one directly from the video portion 104 of the combined AV-USB device or from the host computer 102 via the USB cable 112. For clarity of illustration, the input and output connectors (other than USB lines and the common audio output monitoring line) are not shown. Since those of skill in the relevant arts are familiar with the input and output connectors described, further illustration details are believed unnecessary here.

The combined configuration also provides efficiency in connectivity to monitoring speakers. For example, common cable line 118 may be used for connecting to a loudspeaker system 110, such as stereo speakers or a 5.1 speaker system. Thus, for example, only one pair of RCA connectors are required to provide connectivity to monitor the audio portion of a video signal (such as might be generated from a video card) or from an audio processor 106. In particular, audio 119 from the video portion may be coupled directly to the audio portion signal over line 118. In a first embodiment, the video portion preferably provides video capture capabilities from analog video signals as well as pass through capabilities for digital video signals.

FIG. 2A is a diagram illustrating a circuit configuration for a combined audio video device in accordance with one embodiment of the present invention. This diagram focuses on the operation of the device to process in a conventional manner an audio video signal without using the audio enhancement capabilities of an audio processor configured in the same housing. In the case of an analog video signal from a video source 202 (e.g., a camcorder), the analog video signal 204 initially undergoes conversion to a digitized form in the video decoder module 208 of the combined AV device. The signal 209 transmitted from the output of the video decoder 208 is preferably in any standard digital video format, for example, a digitized format compliant with ITU-656. ITU-656 is a digital component interface (also known as CCIR-656). It defines a coding for component video sometimes abbreviated as YCrCb. Next, the signal 209 is directed to a digital video encoder module 210, for conversion to a compressed format. As illustrated, the audio portion from the camcorder 206 is preferably routed in this embodiment through a separate audio ADC conversion module 201 to provide a digital audio signal. Preferably, the digital audio signal generated by the conversion is in an $I^2S$ format, for later processing by the digital video encoder 210. The digital video encoder 210 synchronizes the digital audio and video signals for generation of a compressed digital output signal 212, preferably in one embodiment, compliant with the MPEG standard, e.g., MPEG-1 or MPEG-2. The synchronized digital (MPEG) signal 212 is then forwarded to the host computer 214, preferably using USB connectivity cables, and preferably over a USB hub (not shown). FIG. 1 illustrates the interconnectivity and functioning of the USB hub relative to the video device, audio device, and the host PC, and therefore further details will not be provided here. The digital video encoder preferably is configured to pass MPEG-1, MPEG-2 or DV across the USB to the PC. More preferably, the digital video encoder 210 is configured to also transmit other digital formats, including MPEG-4, WMV, and other digital formats that gain acceptance in the future.

FIG. 2B is a diagram illustrating a circuit configuration for a combined audio video device in accordance with one embodiment of the present invention. In this embodiment, enhanced audio processing is performed on the combined audio video device before the separate digitized audio and video signals are recombined and compressed for transmission to a host computer. Initially, the audio 206 and video 204 signals from the video source 202 are processed separately. As illustrated in FIG. 2A and described above, the video signal is first forwarded to a video decoder 208 to generate a digitized video signal 209, for example having an ITU-656 format, before recombination with a synchronized digitized and enhanced audio signal 226 in the digital video encoder 210. The analog audio signal 206 is first converted to a digital audio signal 220 (e.g., $I^2S$) in ADC (i.e., analog to digital converter) module 201. Next, the digitized audio signal 220 is enhanced by audio processor 224. The variety of audio enhancements are numerous and well known to those of skill in the relevant arts, and thus will not be described in full detail here. Examples include, however, noise removal, upmixing of two-channel audio to a 5.1 audio signal, adding reverberation, gain control, mono-to-stereo conversion, and sound shaping in general. Next, this audio enhanced digital signal 226 is combined with the digital video signal 209 in a synchronized manner in the digital video encoder 210. As with the configuration illustrated in FIG. 2A, an encoded stream 212 is transmitted to the host computer 214. The encoded stream 212 is preferably compressed to comply with MPEG or DV formats, however the scope of the invention is not so limiting. The encoded stream may be processed by any suitable CODECS, for example, including without limitation MPEG-4, WMV, WMA, DivX (a particular MPEG-4 based codec), etc. This configuration allows the audio processing circuitry 230 to be shared for "sound card" type audio enhancement functions (e.g. listening to or recording music, or playing video games or other types of audio received over independent audio inputs 207) and for processing the audio portions 206 of synchronized audio video signals, such as might be generated by camcorders. Preferably, the device provides video and audio over a single connection or cable 212, for example a USB cable, in a bi-directional manner with the host computer. This minimizes the number of cables necessary for operation. Thus, communication with the host computer may be effectuated for storage or playback, preferably with the ability to have communication in both directions at the same time. Although the combined digital audio and video may be synchronized and transmitted to the host computer using an uncompressed format, preferably the combined signal is compressed in the device into a DV or MPEG stream for efficient use of the bandwidth provided by the transmission line to the host computer. For example, signals compressed in accordance with the DV format may requires bandwidths of 25 Mbit/sec whereas MPEG signals require bandwidths from 1.0 to 9.5 Mbit/sec. for this type of product.

The enhanced audio functionality may be performed real-time during video capture and encoding without burdening the host computer or causing extra processing steps for the host computer. Specifically, as video/audio is captured, the audio is signal-processed in real-time through the audio chip on the audio processor board in order to provide extra capabilities while permitting the digital video encoder chip to dedicate itself to video encoding. Preferably, the audio processor board enhancements are performed in high fidelity. Digital video encoder chips provide only limited audio processing capabilities and are incapable of providing any high fidelity enhancements. In this embodiment, the processed audio is fed back into the digital video encoder and becomes part of the encoded stream sent to the PC. More particularly, the digital video encoder preferably takes the uncompressed (but enhanced) digital audio and converts and compresses it to MPEG Audio, Dolby Digital or LPCM—then MUXes it in with the video to create the encoded stream sent to the PC. The scope of the invention is intended to extend to any audio processing effect, for example, including but not limited to noise removal, upmix to 5.1, downmixing, filtering, sound spatialization, sound expansion, reverberation effects or other sound shaping. In particular, the combined hardware preferably is configured to provide a DVD-compliant MPEG stream with surround sound (5.1) audio encoded in Dolby Digital or DTS during the real-time video capture process without burdening the PC.

Alternatively, as video/audio is captured, the audio can be mixed in real-time with other sources of audio that are inputted to the audio processor board (e.g. real-time voiceover from a microphone at microphone port 207B). The combined audio thus becomes the digital audio that is encoded as part of the MPEG stream sent to the PC.

Independent audio inputs are preferably provided to the audio processor 224 using audio inputs 207A (line in) and 207B (microphone). Accordingly, the audio processing circuitry 230 and the audio processor 224 in particular may perform typical sound card functions. For example, audio enhancement may be added to the audio signals such as from a DVD, CD recording, or radio or TV recording. The audio processor is coupled to the host computer 214 in a bi-directional manner over line 232, preferably using USB hub 250. Due to this configuration, audio emanating from a video game or other source on the host computer can be enhanced and monitored using the audio processor 224. The audio processor can according to this configuration or any of the configurations described also augment the host computer's editing capabilities. For example, the audio processor chip can be used to provide hardware assistance for audio operations during editing and rendering. That is, the software in the host computer may be configured to send audio over the USB cable to the device and use the capabilities of the audio chip on the audio processor board to accelerate audio operations such as: audio filters (EQ or noise removal), upmix, environments or (re)compression. In a similar manner, the video processor chip may be used to accelerate recompression during video editing and rendering operations assigned to the host computer. For example, the software may be configured to send video over USB to the device and use the capabilites of the video encoder chip on the video board to accelerate video operations such as compression into MPEG. Alternatively, the accelerated operation may be a video filtration operation, e.g. color adjustment, rescaling, video transition, etc.

FIG. 2C is a diagram illustrating a circuit configuration for a combined audio video device in accordance with one embodiment of the present invention. In this embodiment, the audio signal 206 (from the audio video signal) is processed separately from the audio processing circuitry 230. That is, the audio processing circuitry 230 is not used to process the signal 206, but rather performs typical sound enhancement functions found on separate sound cards on separate (independent) audio signals. These enhancements are as described above and preferably include at least one of filtering, sound expansion, sound spatialization, mixing, upmixing, downmixing, 3D spatialization, noise reduction, and reverberation. The audio input 207A is preferably a conventional audio analog input (line in) such as from a DVD, CD recording, or radio or TV recording whereas input 207B is a microphone input for recording human voice or other live sources. The latter input may be used to provide a "voiceover" capability to a video recording. FIG. 2C further differs from the embodiment depicted in FIG. 2B in that the output of the audio processor 224, i.e., signal 226 is routed directly to the USB hub 250, for transmission to the host computer 214.

FIG. 3A is a diagram illustrating a circuit configuration for a combined audio video device in accordance with one embodiment of the present invention. This embodiment illustrates use of the combined audio video (AV) device 300 for monitoring of a video signal transmitted from a host computer 302. Initially, the compressed video signal 303 (e.g., an MPEG or DV formatted signal) is directed to the AV device. Preferably, communication between the host computer 302 and the AV device is over a USB communications link, and preferably using USB hub 250. Alternatively, the communication may be implemented over other communications links, for example over a DV (i.e., IEEE1394) connection.

Initially, the compressed video signal is directed to a digital video encoder/decoder 304 for decompression and decoding. Preferably, the decoder transmits at its output ports a separate digitized video (e.g., ITU-656) signal 306 and a digitized audio signal 314 (e.g., an I$^2$S formatted signal). The digitized video signal 306 is then directed to an analog video encoder 308 for conversion of the digital video signal to an analog video signal 310, for processing and display by monitor 312. This signal is compatible with analog input connectors found on monitors. Simultaneously, the digital audio signal 314 is converted to analog format in DAC ("digital to analog converter") 316. The analog audio output signal 318 is transmitted from the output of the DAC 316 to a suitable speaker system 320 for monitoring and/or playback.

FIG. 3B is a diagram illustrating a circuit configuration for a combined audio video device in accordance with another embodiment of the present invention. By routing the digitized audio video (AV) signal from the host computer (preferably through a USB hub 250) and decoding it, audio enhancement may be performed on the audio portion in real-time. As illustrated in FIG. 3A and discussed above, the digitized signal 303 from the host computer 302 is fed into the digital video encoder/decoder 304 of the AV device 330. The video signal is then processed in the same manner as illustrated in FIG. 3A and described above. That is, the video signal 306 is converted to analog and to a format compatible with the video inputs of the monitor 312. Simultaneously, the digital audio signal 314 is processed by an audio processor 334, followed by digital to analog conversion in DAC ("digital to analog converter") 316. The audio processor may be configured to perform any audio enhancement, such as including those described above. For example, these enhancements may include noise removal, upmixing of two-channel audio to a 5.1 audio signal, adding reverberation, gain control, mono-to-stereo conversion, and sound shaping in general. The analog audio signal 318 available at the output of the DAC module 316 is then transmitted to the speaker system 320 for playback or monitoring. Optionally, the analog audio signal may be routed by link 319 to a loudspeaker or other audio playback device at the monitor 312. Separate audio signals 317 from the host computer may be routed directly to the audio processor 334. These include, for example, audio signals form MP3 files played back on the host computer. These audio signals may be enhanced using audio processor to provide any sound enhancements typically provided above, including but not limited to those described above with reference to FIGS. 1-3. In this configuration, the audio processing circuitry 336 performs a dual function: enhanced processing of audio portions of AV ("audio-video) signals and separate processing (i.e., enhancement) of audio signals, e.g., for gaming or music playback or other suitable applications. It is to be understood that the functional operation of the audio video USB device has been described and illustrated particularly in FIGS. 1-3 to show different operational modes. It is to be appreciated that preferably all or selected combinations of these modes are to be incorporated in the combined device, thus providing a single device in a single enclosure having a common power line and a common connection (USB hub and cable) with a host computer. Thus, for example, the PC (the host computer) has been illustrated in the different operating modes with different reference numbers for clarity of illustration. It is to be appreciated that preferably a single host computer is connected over a single USB hub contained within the device in a bi-directional manner, thus providing digitized audio to the host computer and receiving from the host computer digitized audio for enhancement in the combined device's audio and/or video processors. Further illustrative details of one embodiment of the combined device are described with reference to FIG. 4.

Figure 4B:
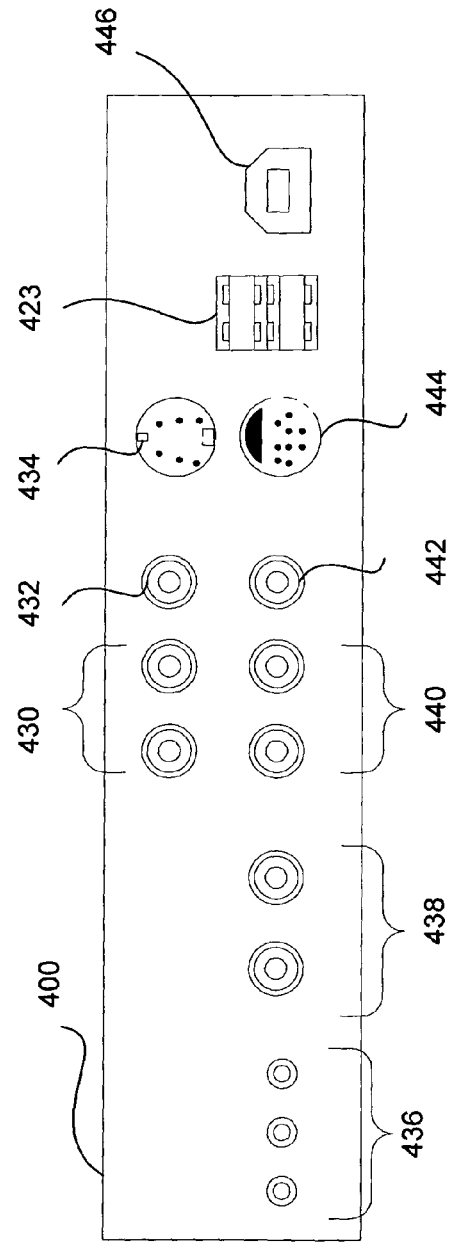

FIGS. 4A-B are diagrams respectively illustrating front and rear panels of an exemplary combined audio video device in accordance with one embodiment of the present invention. In FIG. 4A, a sample front panel of the combined device 400 is shown. The exemplary combined device 400 includes optical (e.g., TOSLINK) input and output connections 414 and 416 for digital audio. Further, composite video 404 and audio 406 inputs as well as S-video inputs 402 are included. A DV input/output port 403 provides communication to DV devices using a IEEE1394 connection. Stereo audio line input jacks 418 and 420 are also illustrated (the stereo line inputs are on the back (440); these are Headphone output (418) and microphone input (420) jacks are also illustrated. Controls 410 and 412 are provided for providing respectively the microphone input volume control and output "Master" volume control. As discussed above, the combined audio-video and USB device preferably in one embodiment includes a USB hub. Two USB ports 422 are shown on the front panel.

In FIG. 4B, a sample rear panel of the combined device 400 is shown. A plurality of line out connectors 436 are included. Further, pairs of stereo RCA connectors are provided for stereo line out 438 and stereo line in 440 capabilities. In addition, composite audio and video connectors 430,432 or S-video 434 provide video output and audio output functions, such as for example during the monitoring illustrated in FIG. 3 and discussed above, or to output video and audio to a camcorder or VCR. Digital audio output may also be provided over SPDIF connector 442. Further USB ports 423 as well as a USB "B" type connector 446 are provided respectively for adding USB compatible peripherals and communicating with the host computer.

The foregoing description describes several embodiments of a combined audio video device providing an external hardware device for connection to a host computer. While the embodiments describe details of the combined device in several operating modes, the invention is not so limited. The scope of the invention is intended to extend to combined audio video devices used in any applications where any of video and audio capture, audio processing, video and audio adapter functions, and USB hub connectivity is used. By configuring audio and video devices in accordance with the embodiments described, efficient use of the external hardware is provided while simplifying the number of added devices coupled to a host computer.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A device comprising:
a video analog to digital converter configured to convert an analog video input signal to a digitized video signal;
an audio analog to digital converter configured to convert an analog audio signal to a digitized audio signal;
an audio processor configured to provide hardware accelerated audio enhancements to the digitized audio signal to generate an audio enhanced digitized audio signal;
an encoder configured to synchronize the digitized video signal with the audio enhanced digitized audio signal to generate a compressed digital output signal; and
a device interface configured to transmit the compressed digital output signal to a host computer connected to the device interface.

2. The device as recited in claim 1 wherein the audio enhanced digitized audio signal and the digitized video signal are transmitted to the host computer over a common transmission line.

3. The device as recited in claim 2 wherein the audio enhancements include at least one of filtering, sound expansion, sound spatialization, mixing, upmixing, downmixing, 3D spatialization, noise reduction, and reverberation.

4. The device as recited in claim 2 wherein the common transmission line is a USB cable.

5. The device as recited in claim 2 wherein the device is configured to provide audio enhancements to at least one of a plurality of audio input signals.

6. The device as recited in claim 5 wherein at least one of the plurality of audio input signals comprises a digital audio signal transmitted over the common transmission line from the host computer to the device.

7. The device as recited in claim 5 wherein at least one of the plurality of audio input signals comprises a digitized audio signal corresponding to the input audio video signal provided to the device and a second of the plurality of audio input signals comprises an audio signal from a source independent from the audio video signal.

8. The device as recited in claim 5 wherein the device is configured to provide audio enhancements to at least two of a plurality of audio input signals and wherein at least one of the two audio input signals comprises a digitized audio signal corresponding to the input audio video signal provided to the device and a second of the two audio input signals comprises an audio source independent from the audio video signal.

9. The device as recited in claim 2 wherein the common transmission line is configured to operate in a bi-directional manner.

10. The device as recited in claim 2 wherein the device is further configured in a playback mode to receive a compressed signal from the host computer over the common transmission line and to convert the signal to at least one of analog audio or video signals for playback on a coupled monitoring device.

11. The device as recited in claim 1 wherein the device further includes an integrated USB hub.

12. The device as recited in claim 1 wherein the compressed signal is one of an MPEG or DV encoded signal.

13. The device as recited in claim 1 wherein the audio enhanced digital audio signal includes audio derived from the analog audio video input signal.

14. The device as recited in claim 13 wherein the enhanced digital audio signal further includes audio from a second audio source.

15. The device are recited in claim 1, wherein the audio processor is further configured to receive control information from the host computer.

\* \* \* \* \*